United States Patent [19]

McRae

[11] 4,099,517
[45] Jul. 11, 1978

[54] SOLAR ENERGY COLLECTOR

[76] Inventor: Duncan Ross McRae, 1409 Wigmore Ct., Raleigh, N.C. 27609

[21] Appl. No.: 808,466

[22] Filed: Jun. 21, 1977

[51] Int. Cl.² .............................................. F24J 3/02
[52] U.S. Cl. .................................................. 126/271
[58] Field of Search ................ 126/270, 271; 237/1 A

[56] References Cited

U.S. PATENT DOCUMENTS

| | | | |
|---|---|---|---|
| 1,673,429 | 6/1928 | Vinson | 126/271 |
| 3,815,574 | 6/1974 | Gaydos | 126/271 |
| 4,046,135 | 9/1977 | Root et al. | 126/271 |

FOREIGN PATENT DOCUMENTS

| | | | |
|---|---|---|---|
| 2,296,151 | 7/1976 | France | 126/271 |

*Primary Examiner*—Carroll B. Dority, Jr.

[57] ABSTRACT

Disclosed is an improved solar energy collection device and method of making the device. A low shear strength solid, a thixotropic or approximately solid coagulum of black energy absorbing material is used to fill an open topped insulated tray, the top of which is glazed with one or more panels of light transmissive material. A heat transfer tube means is embedded in the coagulum of black material in the tray to promote efficient heat transfer to the secondary or storage fluid circulating within the tubing. Increased active heat transfer surface area is achieved by embedding the tubing directly and completely in the coagulum of black absorber material in the tray. The light transmissive glazing material may be in contact with the black coagulum absorption material to reduce convection, reflection and radiation losses back to the atmosphere. The light transmissive cover also acts as a contaminant shield for the coagulum or primary body of energy absorbing material. Since the light transmissive material may be continuously supported on the black embedding material, a measure of protection against snow loading, wind stress and flying missile breakage is provided. Advantageously, the insulated weatherproofed tray assembly can be constructed by simple folding techniques from rigid resin bonded glass fiber reinforced backing insulation board commercially available.

10 Claims, 12 Drawing Figures

SOLAR ENERGY COLLECTOR

FIELD OF INVENTION

This invention relates to solar energy collection apparatus and methods in general and particularly to non-focused tray type or flat plate collectors.

PRIOR ART

A great variety of solar collector apparatus designs exist in the known prior art. All of these, insofar as is presently known, suffer from one or more of the following difficulties. First the glazing sheets or light transmissive material utilized to cover the light receiving surface in the collectors is difficult to support across broad expanses without the unnecessary complication of reinforcing webs, ribs or similar structures within the tray beneath the glazing sheet. Such structures are prone to leakage and are subject to breakage of the glazing material due to thermal cracking, wind or environmental stress or flying missile damage. Secondly, the trays which house the collector apparatus, and which may generally be insulated, are often formed of permeable material which is difficult to work with and requires expensive molding techniques. Thirdly, freeze protection must necessarily be provided in the retained fluid collection systems of the prior art which requires the use of freeze preventive fluids or the heating of the fluid to prevent freezing. Fourthly, collectors in the known prior art suffer from thermal expansion stresses and are subject to breakage, warpage or other mechanical defects due to the restrained and confined nature of their structure or contents. Fifthly, thermal cracking of the energy absorber tubing due to thermal stresses (direct or differential) may occur since tubing or plate material and other components utilized may not be able to withstand the stresses imposed on a heated fluid containing system. Sixthly, the construction of the known prior art devices often utilizes high combustibility materials for insulating compounds for making the trays. The use of such materials may be necessitated by the forming techniques and manufacturing practices in use for making solar collector trays but the deficiency still exists. Seventh, some of the prior art devices suffer from a low absorber efficiency initially and the performance of the devices decays with age with the build-up of scale, algae, or corrosion within the system. Ultraviolet degradation, galvanic corrosion or similar results may also occur. Eighth, many prior art systems must provide energy dumping features to prevent damage to the system or components when sufficient energy has been collected and stored or when runaway or stall conditioning occur. Ninth, many of the prior art solar collector devices suffer from poor heat transfer characteristics in the circulating collector tubing due to a minimal surface area contact between the tubing and the often used collector plates. Finally, and of great significance, is the fact that most of the prior art solar collector devices require specialized tubing or material or parts and are not easily constructed using standard available materials and methods of assembly.

OBJECTS OF THE INVENTION

In light of the foregoing and still other unenumerated shortcomings in the known prior art solar energy collector devices presently known, it is an object of this invention to provide an improved solar energy collection apparatus which is easily formed using standard materials and methods of assembly and which is not subject to the requirements of overheating protection and is not subject to thermal expansion stress failures, combustion, or decay or degradation with age.

Still another object of the present invention is to provide an improved method of forming solar energy collector devices using standard available materials and techniques.

Yet another object of the present invention is to provide an improved solar energy collection device in which maximum heat transfer area between the collection and storage fluid circulating tubing and the primary absorber is achieved in a manner which does not promote the problems with freezing the absorbing media external to the tubing or with thermal stresses and separation or leakage of the primary media in such systems.

The foregoing and still other objects of the present invention not mentioned are met in the present invention which will be described with relation to a preferred embodiment thereof further shown and described in the drawings in which:

SUMMARY

The foregoing objects are met in the present invention by utilizing a wetted carbon bed mixture as the primary solar energy collection medium. In this system, a low shear, approximately solid coagulum of wetted carbon black energy absorbing material is directly utilized as the primary solar energy absorbing surface and transfer medium. The bed of carbon black coagulum coverts solar radiation to heat energy in an efficient and direct manner. It promotes the rapid transfer of heat to an embedded fluid circulation tubing contained in the bed of carbon black coagulum. The carbon bed is utilized in place of the conventional known black solar energy absorbing surfaces such as blackened tubing, plates, fluids, etc. Heat transfer to the tubing embedded in the black coagulum is rapid due to the use of carbon black material which has a relatively high energy transmissivity in conduction. Rapid transfer to a fluid circulating within the tubing is promoted by having the tubing embedded in the carbon bed to contact the maximum active surface area on the exterior of the fluid circulating tubing. Insulated tempered glass or transmissive panels may be used to glaze the top surface to contain the carbon absorption material and to reduce conduction and infra red re-radiation losses back to the atmosphere. By placing the glass directly in contact with the carbon coagulum bed such losses are reduced. The insulated weatherproof tray which is utilized to hold the bed of carbon black coagulum is conveniently formed of readily available glass fiber insulated panels having a resin bonded foil covered glass fiber reinforced back which acts as an impermeable barrier to the outside environment.

DETAILED SPECIFICATION

Figure 1:
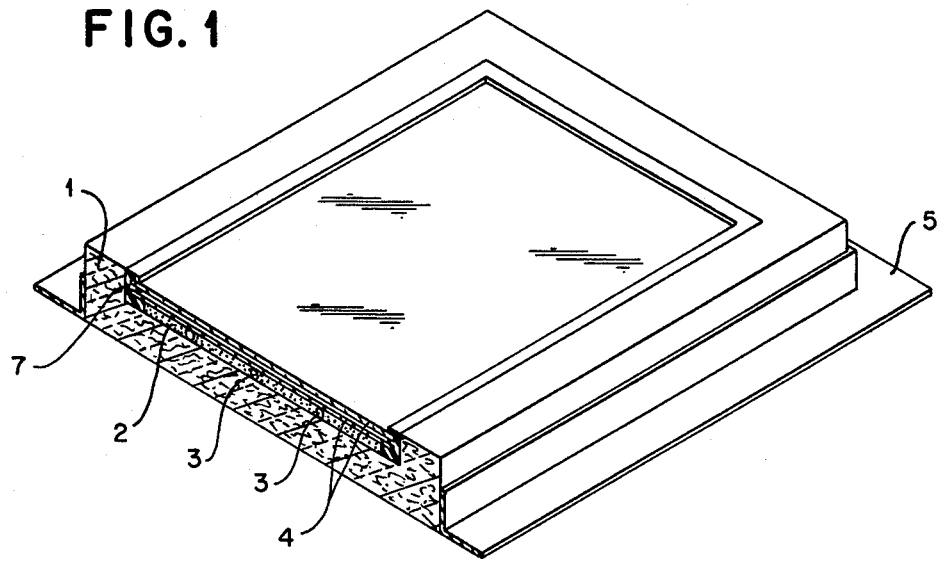
FIG. 1 illustrates a partially cutaway perspective of a schematic, simplified type of improved solar energy collector according to the present invention.

Turning now to FIG. 1, a schematic view of a typical preferred embodiment of the invention is illustrated in a partially cutaway section. The insulated open topped tray 1, which may be formed as discussed below, is conveniently mounted on a roof or other supporting structure (not shown) by flashings or suitable similar mount 5 as illustrated. Tray 1, being best rigidly supported and oriented in the direction necessary to be exposed to the sun's rays, is filled with a bed of wetted coagulum of carbon black material 2 which is produced as will be described briefly below. Embedded in the layer of carbon black material 2 is a continuous fluid circulation heat transfer tubing 3 which may be fluted, finned or otherwise of increased surface area. One or more tubing elements 3 can be used. One or more panes of light transmissive glazing material 4 are illustrated in FIG. 1 supported by a suitable beading, frame or support means 7 at the perimeter of the tray. The bottommost or innermost pane of glazing material is supported directly on carbon bed 2 to contain the material within the tray and to provide continuous support for the pane of glass or other glazing material utilized.

Figure 2:
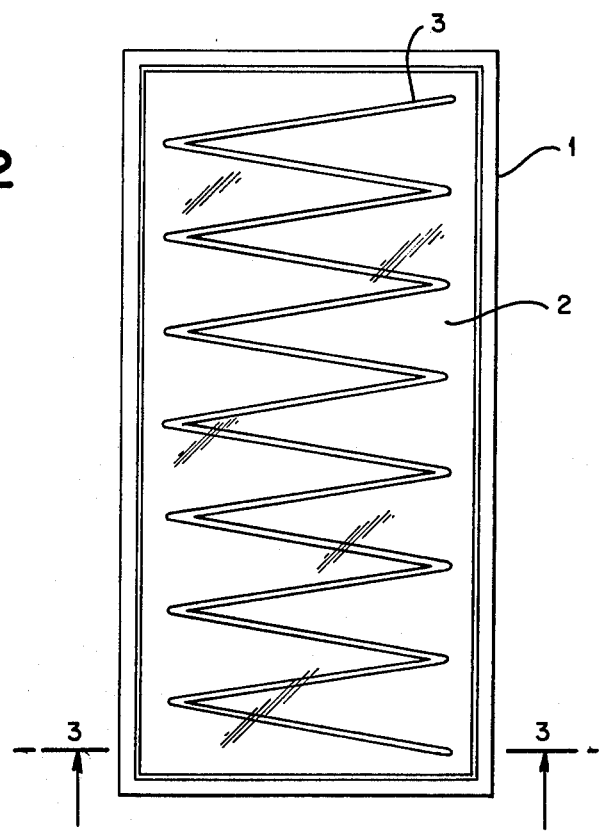
FIG. 2 illustrates a simplified schematic top or plan view of the solar energy collection apparatus according to the invention.

In FIG. 2, a top or plan view of the schematic representation for the preferred embodiment of the present invention is shown. It may be seen that the open topped, thermally insulating tray 1 can be of any desired size and that the fluid conduit 3 for taking away heat collected by the carbon bed 2 can be a continuous piece of tubing supported within the carbon bed 2 itself without other restriction or mechanical structure which would impede flexure in tubing 3. The bends and curves in tubing 3 serve to provide expansion flexure absorbing areas for the tubing and the soft, putty-like nature of the carbon black coagulum bed 2 further serves to prevent the build-up of stresses by permitting small motions to take place between the various elements.

Figure 3:
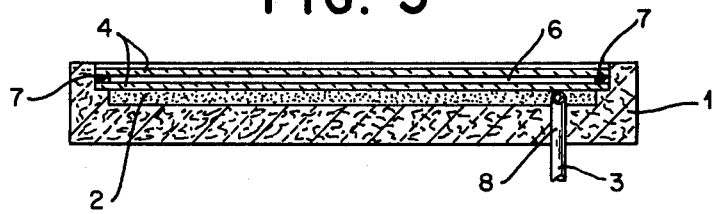
FIG. 3 illustrates a sectional view taken horizontally through a preferred embodiment of the solar collection apparatus.

In FIG. 3, a sectional view taken along the lines 3—3 in FIG. 2 is shown. It may be seen that the bed of carbon black coagulum material 2 is contained directly within the confines of tray 1 and is in contact therewith while fluid conduit tubing 3 is embedded directly in the coagulum material 2 for intimate contact therewith. The innermost sheet of glazing material 4 is also in direct contact with the coagulum bed 2 to confine it to the interior of tray 1 and to serve mutually as a support for the extended expanse of glazing panel 4. Two glazing panels 4 are shown in the preferred embodiment in FIG. 3 which are separated by a spacer or bead 7 to create a small air or vacuum space 6 as shown. Such double pane insulated glass assemblies can be purchased already constructed of tempered glass, plastic panes, double film structures or similar insulated tight transmissive material. In the preferred embodiment of the invention, such material is utilized.

It also should be noted that, by having direct contact between the innermost pane of glazing material and the bed of coagulum material 2 an air interface which would promote reflection or radiation is eliminated. Also, convection losses which might occur between the innermost sheet 4 and the coagulum material if a space existed between them are reduced or eliminated.

Since the coagulum material 2 is not a rigid solid but acts more in the manner of a putty or thixotropic substance, it is free to flex, flow and absorb thermally induced expansion and contraction motions of tubing 3 without the build-up of stresses which might cause cracking or breaking of the components. Secondly, since the material 2 does not flow in the manner that a liquid flows, it is not necessary to tightly seal the periphery or joints which exist between the glazing material, the tray and the apertures 8 by which tubing 3 may enter and exit the body of tray 1. It is also apparent that the secondary collection fluid tubing 3 will have its maximum heat transfer area in contact with the primary absorbing bed material 2 to utmost efficiency of heat transfer to the fluid circulated within tube 3. A minimum of formed or machined parts are required in the apparatus as shown and the simplicity of the construction is apparent. As will be described below, in the preferred embodiment of the invention, the tray 1 is formed from rigid glass fiber insulation panels which have an integral fabric, foil, and resin moisture barrier which is impermeable and which has low combustibility and relatively high physical strength and integrity.

The result of using weatherproof impermeable tray assembly 1 to house the various components reduces conduction and convection losses to the environment as will be well understood by those skilled in the art.

The bed of coagulum material 2 is formed of a black carbon powder which may be lamp black, carbon black, furnace black or any of a wide variety of similar carbon powders. This powder has been wetted to form a coagulum using an oil. The wettability of the furnace black or carbon black powder is high. The carbon particles used have an average diameter of 20 to 80 millimicrons so that a relatively small amount of oil by volume is required to wet the carbon particles and form the coagulum. Following full mixing of the two components, a soft generally formable semi-solid material results. This material can be poured or molded by spreading it into the interior cavity of the tray 1 once the fluid conducting tubing 3 is in place. The material does not tend to leak or flow freely and is resistant to high temperatures well beyond those which may be experienced in the collector. The high thermal conductivity of wetted carbon black, on the order of the oil used to form the mixture, is advantageously used in the present invention to promote efficient and rapid heat transfer to the fluid conduit 3. Silicone oils such as those readily available may be used, but ordinary motor oils, even waste or drain oils can be effectively used since they easily withstand high temperatures.

Figure 4:
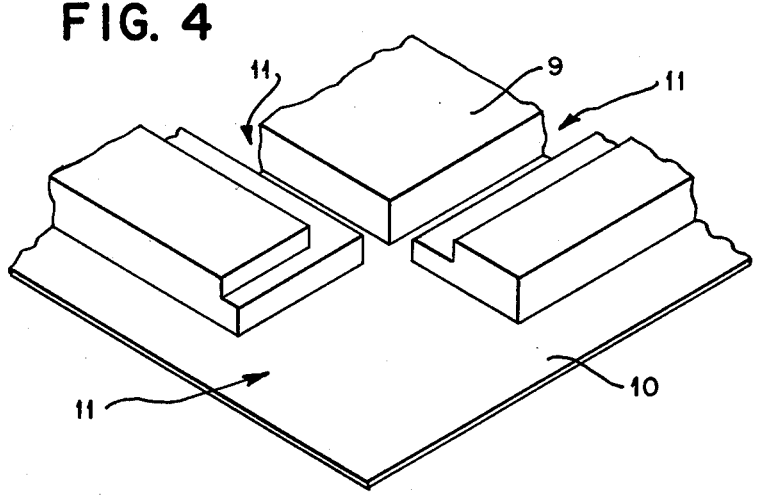
FIG. 4 illustrates the cutting lines and forming steps taken on a sheet of standard insulation material preparatory to forming one embodiment of a solar collector tray according to the invention.

Turning to FIG. 4, the method of forming tray 1 will be described in greater detail. Tray 1, as shown in FIGS. 1 through 3 as an assembly of pieces of material, can most advantageously be formed of two trays nested together, an inner and outer tray respectively. The outer and inner trays are formed in the preferred embodiment by a cutting and folding operation utilizing continuous pieces of resin bonded glass fiber insulation board. As shown in FIG. 4, the outer tray is a container for the inner tray. The inner tray is a container for the coagulum. Each tray has a continuous bonded backing of reinforced metal foil 10 which serves as an impermeable moisture barrier. Various cuts 11 have been made in the foil backed reinforced glass fiber board material 9 to remove segments of the material as shown, leaving the foil backing 10 intact. Once the panel has been cut as shown, the resulting insulation board panel may be folded along the cutout lines 11, leaving back 10 on the exterior surface of the tray. The impermeable backing 10 thus forms a continuous, unbroken vapor barrier and an impermeable reflector surface for the outside of tray 1. A tray thus formed also reduces the losses through it to the outside environment. The outer tray 1 shown in FIG. 4 utilizes the foil backing as an outer skin for the insulated tray.

Figure 5:
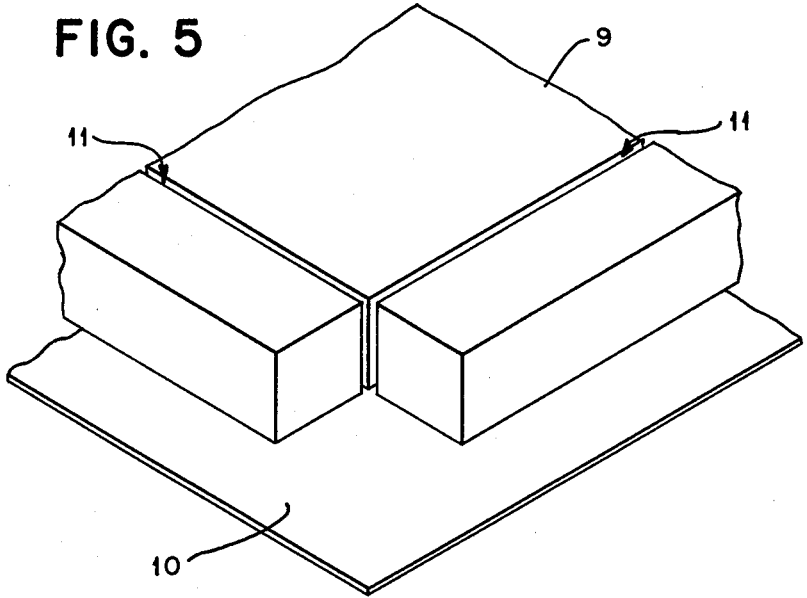
FIG. 5 illustrates another of the forming and cutting operations performed on a standard sheet of material preparatory to forming a solar collector tray according to the invention.

FIG. 5 illustrates the cutting pattern which may be utilized for forming an inner tray of the glass fiber reinforcing insulation panel material 9. The material to be cut away to leave backing 10 as shown and then the material can be folded along the cut lines 11, leaving backing 10 on the inside of the tray so formed to create an inner tray to be nested within the confines of the outer tray formed as shown in FIG. 4.

Figure 7:
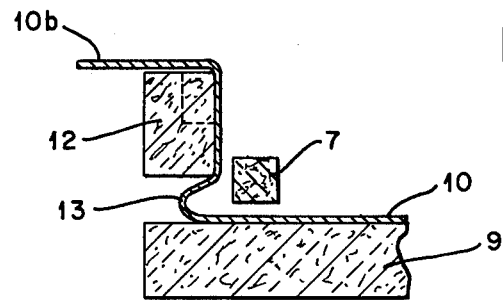
FIG. 7 illustrates another step in forming a solar collector tray according to the invention.
Figure 6:
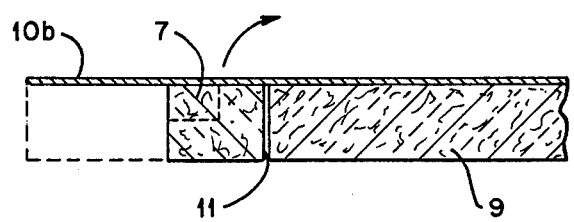
FIG. 6 illustrates in detail one of the steps in forming a tray of insulated and impermeably surfaced material for a solar collector according to the invention.

FIGS. 6 and 7 show steps in folding the inner tray cut along the lines indicated in FIG. 5 from a panel of glass fiber insulation board. The impermeable barrier (backing 10) is left intact and is not cut along the lines 11 shown so that, as illustrated in FIG. 6, it bends along the cut line 11 when it is folded in the direction of the arrow as shown. A small segment 11 of insulation material 9 may be cut away if desired and utilized as the spacer 7 as shown in FIG. 7 and also as a means for creating a ledge or lip on which glazing material 4 could rest, such as by the element 12 shown in FIG. 7. The fold of the metal backing foil 10 is indicated as 13 in FIG. 7 and serves to seal the interior periphery formed by backing surface 10 to make an impervious and continuous barrier layer on an inner side which would be in contact with the carbon coagulum material.

Figure 8:
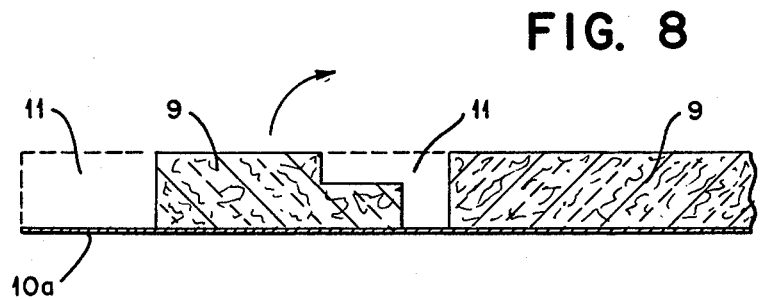
FIG. 8 illustrates the step in forming a tray utilizing material formed according to FIG. 4.
Figure 9:
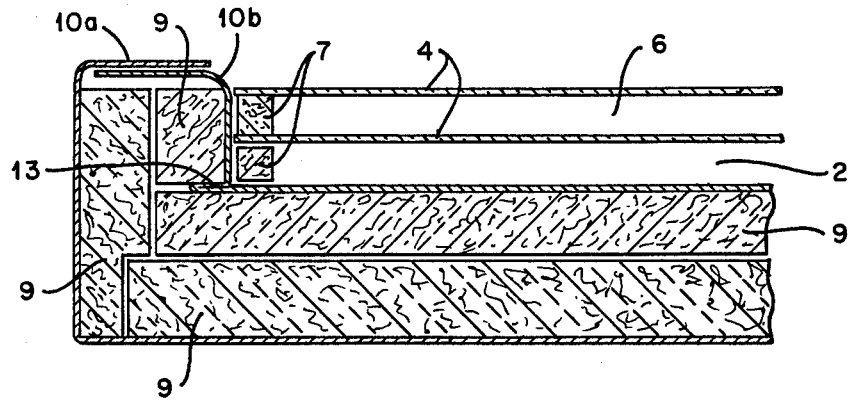
FIG. 9 illustrates a sectional view of the completed assembly according to the invention.

FIG. 8 shows steps in folding a final cut panel as indicated in FIG. 4 to create an outer tray, in which a tray folded as shown in FIGS. 6 and 7 can be nested. Impervious foil backing layer 10, which is integral with panels 9, is left intact as shown and an elongated flap of this material is left by cutting away material indicated as 11 in FIG. 8. When the outer tray has been folded, this flap of material 10a can be folded over the corresponding flap 10b shown in FIG. 7 left on forming the inner tray. The inner and outer trays may be nested together as shown in FIG. 9 with the flaps 10a and 10b on FIGS. 8 and 6 and 7, respectively, folded as shown to seal the edges of the nested trays. The flaps 10a and 10b may be adhered together with a waterproof adhesive if desired. It may be seen that the resulting structure as shown in FIG. 9 is easily made by simple folding techniques after precutting rigid glass fiber panels 9 and that an integrally formed, impermeably surfaced tray will result for appropriately containing the coagulum material in the space provided in the inner tray.

It will also be observed that excess material cut away during the operations illustrated in FIGS. 4 and 5 may be utilized to form spacer 7 in the completed assembly, thus eliminating waste of material.

Figure 10:
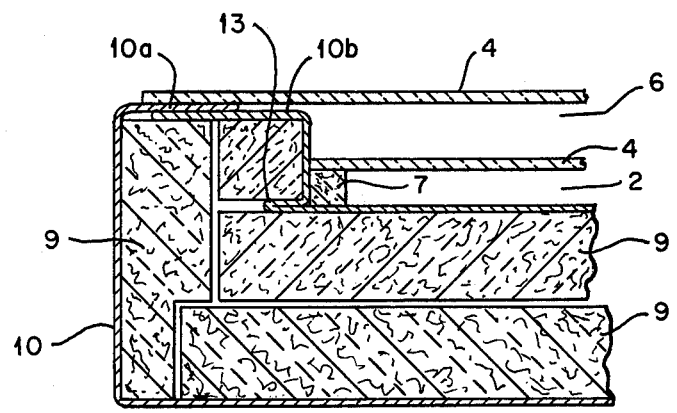
FIG. 10 illustrates an alternative embodiment of the invention.

An alternative embodiment is illustrated in FIG. 10 in which the inner tray is formed in a manner similar to that previously described and the outer tray formed in the same manner to that previously described but the inner and outer glass panes 4, respectively, are not of the same size. In the embodiment shown in FIG. 10, the outermost glass panel 4 is larger and directly overlies the flaps of foil metal backing 10a and 10b where it may be suitably attached by an adhesive sealant not shown. This arrangement eliminates one spacer 7 and may be somewhat easier to construct.

Figure 11:
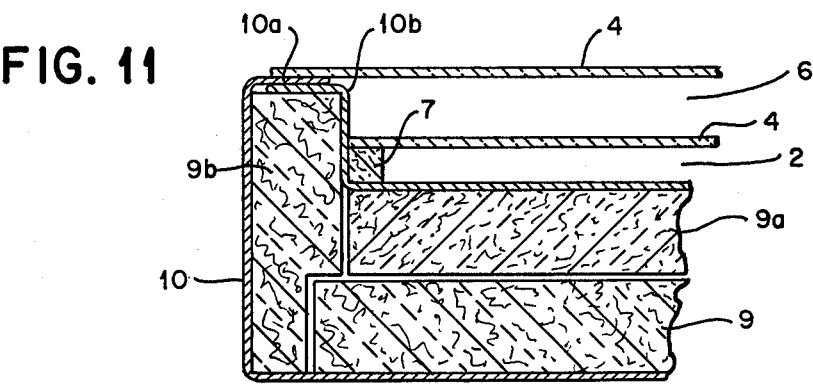
FIG. 11 illustrates another preferred form of the invention.

FIG. 11 illustrates another alternative embodiment in which the inner tray is simply formed of a black panel 9a which has had the excess material at one end cut away to leave flaps 10b of the integral metal foil backing. This flap 10b is folded up and over segment 9b of the outer tray formed in the same manner as the previous discussion indicates, so that the flap 10a there may be folded over the flap 10b in the inner tray made of member 9a. The support bead or spacer 7 as shown can support the inner sheet of glass 4 in contact with the coagulum of carbon material 2 as illustrated and the outer panel 4 may be in direct contact with the area of the tray on the line where the overlapped flaps 10a and 10b are shown.

Of course it would be appreciated by those skilled in the art that a great many alternative cutting and folding patterns may be generated to create inner and outer trays having an integral and impervious barrier layer of metal on them so long as the generally available glass fiber reinforced metal backed material is used. It is not intended to limit the present invention to any of the specific cut and fold designs shown, but to illustrate, rather, that numerous such designs can be made to exhibit the desired characteristics of being an impervious surfaced, self-insulated and easily formed tray.

The preferred materials for use in the inner and outer folded tray construction are commercially available as Owens Corning Corporation fiber glass duct insulation system Type 475-FR, 800-FR and 1400-FR duct board. This material conforms to the Underwriters' Laboratory Class I rating or better. It consists of a resin bonded glass fiber insulation panel which is faced with a glass fiber scrim reinforced with metal foil. These commercially available materials are sold in solid panels and exhibit structural integrity. The material is normally used for the construction of heating and cooling ducts in heating, ventilating and air conditioning systems. As such it exhibits many of the characteristics which make it desirable for the present invention since the material is light, strong, highly insulated and very fire resistant. The material has a temperature rating before flame and combustion can be supported of 400° F or better which makes it a most satisfactory material for use in a heat collector such as in the solar energy system shown.

Substitute materials for inner and outer tray construction may be Owens Corning Class 700 Series Industrial Insulation which may have a foil reinforced craft paper facing or its equivalent. A variety of other manufacturers including the John Manville Company and the Certainteed St-Gobain Companies provide equivalent materials.

The solar energy collector described above will achieve a high transmittance and absorption rate through the use of well known so-called "solar" low iron content glass since this is the most transparent type available. It is also made more efficient by having the absorption carbon bed material directly in contact with the inner glass glazing surface. This arrangement eliminates an air space between the inner glass cover and the collector carbon bed. Further, by using a wetted carbon granule bed as an absorber, a 99 percent absorption of incident radiation on the bed is achieved with a minimum re-radiation back to the cover. Thus a high transmittance, high absorptance solar energy collection device is readily produced for collection of both direct radiation and diffuse radiation.

Heat transferred to a circulating fluid within tube 3 is maximized by the use of the highly thermally conductive properties of the wetted carbon black bed 2 and high thermo conduction properties of the tubing 3 which may be of copper or other suitably available material. Tubing 3 may be finned, fluted, or otherwise deformed to increase the surface area for even greater heat absorption.

The estimated performace of the present embodiment of the invention assuming a glass transmissivity factor of 98 percent per layer of glass, and assuming a 4 percent reflection loss for each of the three surfaces not in contact with the carbon bed, yields an 88.5 percent radiation capture efficiency for radiation striking the surface of the carbon bed. For a designed maximum operating differential temperature rise of 100° F., the infra red and convection radiation losses through the glass plates and through conduction to the atmosphere does not exceed 15 percent of the energy captured. The resultant theoretical collector efficiency would be on the order of 75+ percent which is quite high for unfocused flat plate or tray collector devices as can be well appreciated by those skilled in the art.

Figure 12:
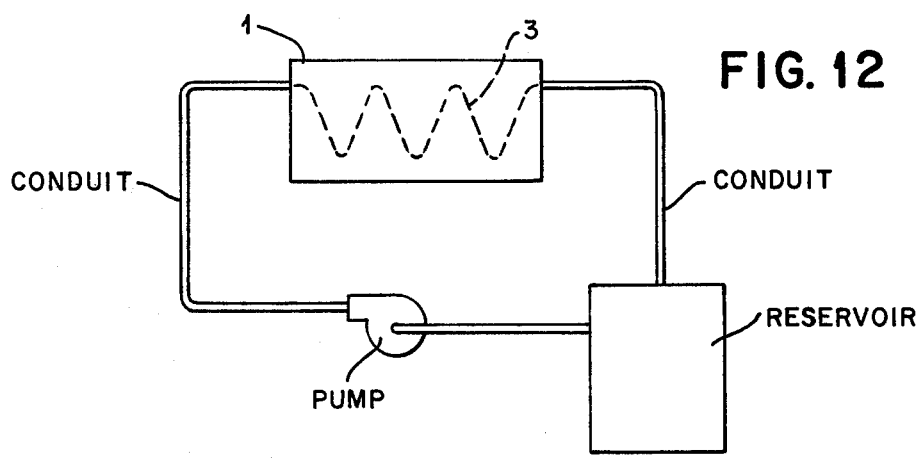
FIG. 12 illustrates the system constructed with the preferred embodiment for a solar energy collector.

FIG. 12 illustrates the preferred embodiment of a solar energy collection and storage system using the improved collector described above. In FIG. 12, collector tray 1 and fluid conduit 3 are connected to a circulation pump means and a storage reservoir for containing the heated fluid from conduit 3. The general details of such a system are well known to those of skill in the art, but it is preferred that collector 1 be higher in elevation than the reservoir so that, when the collector is cold or when sufficient liquid has been heated, the system can be shut down simply by turning off the pump and allowing the liquid to drain down into the reservoir. Because the collector 1 is capable of withstanding high stall temperatures, no elaborate protection for drain down collector temperature excursions are necessary, and, also, no complicated freeze protection other than drain down of the fluid in the conduit 3 is necessary.

ADVANTAGES

Many advantages are clear from the present invention as will be appreciated. First, overheat protection is not a problem with the preferred embodiment shown since the materials are all of higher temperature rating than can be generated. The collection fluid in tubing 3 can simply be drained down to the reservoir whenever low temperatures are anticipated. Secondly, since the insulation tray material has a high insulation value and the wetted carbon bed and glass cover system has a low re-radiation factor, energy collected tends to be retained within the system so that freezing is not as apt to occur. Collector differential expansion stresses are not a problem with the preferred embodiment since the hot carbon bed collector material is not physically restrained in a way that would prevent expansion and contraction of the volume of material provided. The elimination of other thermal stresses due to the differential material expansion rates between the collector surface and the circulating fluid tube material is also eliminated since the material of the collector may be flexed or deformed by any build-up of stress because it is a flowable or semiplastic material. Furthermore, corrosion and galvanic action is greatly reduced and/or eliminated in the preferred embodiment since the absorptive bed material is virtually inert and is not reactive with water or other corrosive liquids. By supporting the heat collection tube within a bed of a thixotropic or low shear coagulum carbon black material, there is no dissimilar metallic contact presented in the present invention. The use of the preferred glass fiber reinforced insulation panels to form the tray results in a highly noncombustible structure. The typical temperature ratings for this material are 400° F. This is a temperature beyond the maximum expected or runaway failure temperature that can be created in flat plate solar collectors. The use of a carbon black coagulum material results in a 100 percent black body absorption characteristic and is a thermally stable material not subject to degradation by exposure to heat of the environment. There is no repainting or loss of absorption capabilities with exposure in this substance.

Having thus briefly described the preferred embodiment of my invention, its method of manufacture and employment, what is desired to be protected by Letters Patent and what is claimed is as follows:

1. Solar energy collector apparatus, comprising:
   an insulated, open-topped tray;
   a moldable black coagulum of wetted carbon material being contained in said tray;
   at least one sheet of light transmissive material covering said open top of said tray and said coagulum of carbon material therein; and
   at least one heat transfer fluid conduit embedded in said coagulum of wetted carbon material, said tube entering and exiting through the walls of said tray.

2. Solar energy collection apparatus as described in claim 1 and further comprising:
   a heat absorbing fluid being circulated in said conduit;
   a reservoir in communication with said conduit; and
   a circulation means connected to said reservoir and to said conduit for circulating the heat absorbing fluid therein.

3. The apparatus as described in claim 2, wherein:
   said tray comprises a folded rigid insulation panel having an integral, flexible, impermeable barrier layer, said panel being folded along lines placed near the edges thereof so that the sides, ends and bottom of said tray are formed from said panels by folding along said fold lines, said folds being placed so that said impermeable barrier layer completely surrounds the exterior surface of all exposed portions on said tray.

4. The apparatus as described in claim 3, comprising:
   at least two of said trays nested one within the other, the innermost of said trays having said impermeable barrier layer facing the inner surface of said tray; and
   the outermost tray being folded with said impermeable barrier layer on the outer surface thereof; said trays being joined with said impermeable barrier layers from said trays overlapping at the edges thereof.

5. The apparatus as described in claim 4, wherein: said optically transmissive cover is supported at least partially on said carbon material within said nested trays and is in direct contact therewith.

6. The apparatus as described in claim 1, wherein: said tray comprises a folded rigid insulation panel having an integral, flexible, impermeable barrier layer, said panel being folded along lines placed near the edges thereof so that the sides, ends and bottom of said tray are formed from said panel by folding along said fold lines, said fold being placed so that said impermeable barrier layer completely surrounds the exterior surface of all exposed portions on said tray.

7. The apparatus as described in claim 1, wherein: at least two of said trays nested one within the other, the innermost of said trays having said impermeable barrier layer facing the inner surface of said tray; and
the outermost tray being folded with said impermeable barrier layer on the outer surface thereof; said tray being joined with said impermeable barrier layers from said trays overlapping at the edges thereof.

8. Apparatus as described in claim 7, and further comprising:
said optically transmissive cover is supported at least partially on said carbon material within said nested trays and is in direct contact therewith.

9. The method of making an insulated solar energy collection apparatus comprising steps of:
forming an insulated, impermeable barrier backed insulating panel by cutting kerfs through said insulation to said impermeable backing;
folding said kerfed panel along said kerfs to form a relatively shallow open topped tray having said backing facing the interior of said tray;
filling said tray with a coagulum of carbon black material;
embedding a fluid conduit tube means in said coagulum material; and
covering said open top of said tray with at least one sheet of light transmissive material, said sheet of material. being in contact with said coagulum of carbon material 10. The method as described in claim 9 and further comprising:
nesting two of said trays one within the other, at least the outer said tray being folded with said backing facing the exterior of said tray.

* * * * *